Patented Aug. 4, 1931

1,817,893

UNITED STATES PATENT OFFICE

GEORGE O. CURME, JR., OF WHITE PLAINS, NEW YORK, ASSIGNOR TO CARBIDE AND CARBON CHEMICALS CORPORATION, A CORPORATION OF NEW YORK

NONINFLAMMABLE LIQUID

No Drawing. Application filed April 30, 1927. Serial No. 188,051.

Carbon tetrachloride is in extensive commercial use as a fire extinguisher because of well-known properties which it possesses. At moderate temperatures, such as those produced by incipient conflagrations, it vaporizes freely producing a heavy non-combustible vapor, and this vapor surrounds the place of evaporation excluding oxygen therefrom and thereby extinguishing the flame. The electrical insulating properties of carbon tetrachloride also adapt it for use about electrical conductors, where many fires originate.

It is regarded as desirable, and is required by certain regulations, that fire-extinguishers of the type just discussed shall not congeal above $-50°$ C. Since carbon tetrachloride freezes at $-23°$ C., it is customary to add to it, when it is intended for use as a fire extinguisher, a substance adapted to depress the freezing point. Chloroform, for example, is used for this purpose, but is not free from objections, such as relatively high cost and powerful narcotic action.

Carbon tetrachloride is also extensively used in solvent mixtures for removing grease, waxes, and other substances from wearing apparel and household furnishings. In such use the properties which render it valuable are its fairly good solvent power for the substances to be removed, and its non-inflammability. The latter property permits it to be mixed with highly inflammable substances of good solvent power, such as gasoline, to produce a mixture which is at least not readily ignitible.

I have discovered that the utility of carbon tetrachloride for both the foregoing purposes can be greatly enhanced by mixing it with ethylene dichloride, $CH_2Cl.CH_2Cl$. The latter compound boils at about $84°$ C. ($CCl_4$ boils at about $77°$ C.) and solidifies at about $-36°$ C. It burns feebly under certain conditions but is easily rendered non-ignitible under any conditions to which a cleaning liquid may be subjected. Thus a mixture of 4 parts $C_2H_4Cl_2$ and 1 part $CCl_4$ cannot be ignited by a large flame even when absorbed in loose cotton waste.

Ethylene dichloride is also very effective in depressing the freezing point of $CCl_4$, all mixtures of the two compounds which contain 20% or more of $C_2H_4Cl_2$ remaining liquid at $-50°$ C. Such mixtures, even when the proportion of $C_2H_4Cl_2$ is considerably greater than 20%, are practically as effective as pure $CCl_4$ in extinguishing fires.

Ethylene dichloride is an excellent solvent for a large variety of substances, including oils, fats and waxes. It is non-corrosive to metals, and electrically insulating, and while it possesses narcotic properties in common with the other chlorinated hydrocarbons, it is far less dangerous than chloroform in this respect.

A particularly important advantage of mixtures of $CCl_4$ with $C_2H_4Cl_2$ is due to the proximity of their boiling points. This substantially prevents the separation of the two substances on evaporation with the production of an ignitible fraction, which sometimes occurs with other mixtures containing $CCl_4$.

It is of course contemplated by the invention that other substances, such as odoriferous compounds, dyes, solvents, antiacids, and the like may be present, but it is intended to cover in the claims only compositions in which the combined $CCl_4$ and $C_2H_4Cl_2$ represents a preponderating proportion, and in which the proportion of each is sufficient effectively to produce the effects herein ascribed to it.

I claim:

1. A non-inflammable liquid freezing below $-23°$ C. and containing a preponderating proportion of a mixture of carbon tetrachloride and ethylene dichloride.

2. A liquid suitable of extinguishing fires, having a freezing point not higher than $-50°$ C., and consisting essentially of carbon tetrachloride and ethylene dichloride.

3. A non-inflammable liquid containing ethylene dichloride at least about 20% with the balance principally carbon tetrachloride.

In testimony whereof, I affix my signature.

GEORGE O. CURME, JR.